United States Patent
Stiesdal

(10) Patent No.: US 8,330,431 B2
(45) Date of Patent: Dec. 11, 2012

(54) METHOD FOR SMOOTHING ALTERNATING ELECTRIC CURRENT FROM A NUMBER OF POWER GENERATING UNITS AND WIND POWER PLANT INCLUDING A NUMBER OF WIND MILLS WITH VARIABLE ROTATIONAL SPEED

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/154,635

(22) Filed: Jun. 7, 2011

(65) Prior Publication Data

US 2011/0234008 A1 Sep. 29, 2011

Related U.S. Application Data

(62) Division of application No. 12/223,490, filed as application No. PCT/EP2006/069554 on Dec. 11, 2006, now Pat. No. 7,990,113.

(30) Foreign Application Priority Data

Feb. 3, 2006 (EP) ..................................... 06002276

(51) Int. Cl.
*H02P 11/00* (2006.01)
*H02P 9/00* (2006.01)
*H02H 7/06* (2006.01)
*F03D 9/00* (2006.01)
*H02P 9/04* (2006.01)
*F03B 13/00* (2006.01)

(52) U.S. Cl. ............................... 322/29; 290/44; 290/54
(58) Field of Classification Search ..................... 322/29; 290/44, 54
See application file for complete search history.

(56) References Cited

U.S. PATENT DOCUMENTS

| | | | | |
|---|---|---|---|---|
| 6,101,109 A * | 8/2000 | Duba et al. | ...................... | 363/71 |
| 6,301,130 B1 * | 10/2001 | Aiello et al. | .................... | 363/37 |
| 6,670,721 B2 * | 12/2003 | Lof et al. | ........................ | 290/44 |
| 6,940,738 B2 * | 9/2005 | Huang et al. | ................... | 363/127 |
| 7,071,579 B2 * | 7/2006 | Erdman et al. | ................. | 290/55 |
| 7,372,174 B2 * | 5/2008 | Jones et al. | ..................... | 290/44 |
| 7,489,047 B2 * | 2/2009 | Shiota | ............................. | 290/44 |
| 7,511,385 B2 * | 3/2009 | Jones et al. | ..................... | 290/43 |
| 7,551,130 B2 * | 6/2009 | Altenschulte | ............. | 342/357.4 |
| 7,569,944 B2 * | 8/2009 | Oohara et al. | .................. | 290/44 |
| 7,598,687 B2 * | 10/2009 | Buerk et al. | ................... | 318/66 |
| 7,629,705 B2 * | 12/2009 | Barker et al. | .................. | 290/55 |
| 7,656,052 B2 * | 2/2010 | Jones et al. | ..................... | 290/43 |
| 7,692,321 B2 * | 4/2010 | Jones et al. | ..................... | 290/43 |
| 7,692,325 B2 * | 4/2010 | Ichinose et al. | ................ | 290/44 |
| 7,728,451 B2 * | 6/2010 | Ichinose et al. | ................ | 290/44 |
| 7,755,209 B2 * | 7/2010 | Jones et al. | ..................... | 290/44 |
| 7,808,126 B2 * | 10/2010 | Stiesdal | ......................... | 307/84 |
| 7,990,113 B2 * | 8/2011 | Stiesdal | ......................... | 322/29 |
| 8,008,793 B2 * | 8/2011 | Andresen | ....................... | 290/44 |
| 8,053,917 B2 * | 11/2011 | Wakasa et al. | ................. | 290/44 |
| 8,084,875 B2 * | 12/2011 | Letas | ............................. | 290/44 |
| 8,093,740 B2 * | 1/2012 | Oohara et al. | .................. | 290/44 |

(Continued)

*Primary Examiner* — Pedro J Cuevas

(57) ABSTRACT

A method and a wind power plant are provided for smoothing alternating electric current from a number of power generators are provided. Generators are electrically connected to an electric network. Each power generator includes a transformer with pulse width modulation for converting direct current to pulse width modulated alternating current for feeding to the network. The time for feeding the pulses of the pulse width modulated alternating current is different for each generator in order to achieve a more even alternating current as a sum of respective outputs of alternating current from the generators.

7 Claims, 3 Drawing Sheets

U.S. PATENT DOCUMENTS

| | | | |
|---|---|---|---|
| 8,193,654 B2* | 6/2012 | Rickard | 290/44 |
| 8,217,533 B2* | 7/2012 | Jones et al. | 307/82 |
| 8,242,619 B2* | 8/2012 | Arinaga et al. | 290/44 |
| 2003/0227172 A1* | 12/2003 | Erdman et al. | 290/44 |
| 2004/0052100 A1* | 3/2004 | Huang et al. | 363/125 |
| 2005/0282537 A1* | 12/2005 | Burch et al. | 455/423 |
| 2007/0040386 A1* | 2/2007 | Shiota | 290/44 |
| 2007/0108771 A1* | 5/2007 | Jones et al. | 290/44 |
| 2007/0121354 A1* | 5/2007 | Jones et al. | 363/47 |
| 2008/0143111 A1* | 6/2008 | Ichinose et al. | 290/44 |
| 2008/0277938 A1* | 11/2008 | Oohara et al. | 290/44 |
| 2008/0284252 A1* | 11/2008 | Jones et al. | 307/82 |
| 2009/0021013 A1* | 1/2009 | Andresen | 290/44 |
| 2009/0021014 A1* | 1/2009 | Letas | 290/44 |
| 2009/0086520 A1* | 4/2009 | Nishimura | 363/133 |
| 2009/0096211 A1* | 4/2009 | Stiesdal | 290/44 |
| 2009/0121482 A1* | 5/2009 | Rickard | 290/44 |
| 2009/0128402 A1* | 5/2009 | Altenschulte | 342/357.1 |
| 2009/0146426 A1* | 6/2009 | Jones et al. | 290/44 |
| 2009/0146500 A1* | 6/2009 | Jones et al. | 307/82 |
| 2009/0147549 A1* | 6/2009 | Jones et al. | 363/37 |
| 2009/0200803 A1* | 8/2009 | Ichinose et al. | 290/44 |
| 2009/0261589 A1* | 10/2009 | Oohara et al. | 290/44 |
| 2009/0267419 A1* | 10/2009 | Stiesdal | 307/80 |
| 2009/0322086 A1* | 12/2009 | Letas | 290/44 |
| 2010/0049486 A1* | 2/2010 | Xu et al. | 703/6 |
| 2010/0109328 A1* | 5/2010 | Li et al. | 290/44 |
| 2010/0327585 A1* | 12/2010 | Cao et al. | 290/44 |
| 2011/0103110 A1* | 5/2011 | Godridge et al. | 363/74 |
| 2011/0198846 A1* | 8/2011 | Wakasa et al. | 290/44 |
| 2012/0112713 A1* | 5/2012 | Kuehn | 323/207 |
| 2012/0133211 A1* | 5/2012 | Jones et al. | 307/82 |
| 2012/0159214 A1* | 6/2012 | Takahashi | 713/320 |
| 2012/0169053 A1* | 7/2012 | Tchoryk et al. | 290/44 |
| 2012/0193991 A1* | 8/2012 | Jensen et al. | 307/84 |
| 2012/0207138 A1* | 8/2012 | Korn et al. | 370/336 |

* cited by examiner

METHOD FOR SMOOTHING ALTERNATING ELECTRIC CURRENT FROM A NUMBER OF POWER GENERATING UNITS AND WIND POWER PLANT INCLUDING A NUMBER OF WIND MILLS WITH VARIABLE ROTATIONAL SPEED

CROSS REFERENCE TO RELATED APPLICATIONS

This application is a divisional application of U.S. application Ser. No. 12/223,490, filed Jul. 31, 2008 now U.S. Pat. No. 7,990,113, which is the U.S. National Stage of International Application No. PCT/EP2006/069554 filed Dec. 11, 2006, and claims the benefit thereof. The International Application claims the benefits of European Application No. 06002276.1 EP filed Feb. 3, 2006. All of the applications are incorporated by reference herein in their entirety.

FIELD OF THE INVENTION

The present invention concerns a method for smoothing alternating electric current from a number of power generators with pulse width a modulated frequency converter, for example windmills with variable rotational speed. The invention also concerns use of the method for windmills and electricity generating wave power plants. In addition, the invention concerns a wind power plant with a number of windmills.

BACKGROUND OF THE INVENTION

Wind power plants with windmills operating with variable speed are only indirectly connected to the electricity network, which means that the generator has its own AC network where the frequency can vary. In order to transmit electricity to the electricity network, the AC current from the generator is converted into DC, and then to AC again, where the latter AC is adapted to the frequency of the electric network.

When transforming DC into AC, typically a pulse width modulated (PWM) frequency converter is applied, however resulting in uneven current having abrupt steps or discontinuities in voltage and amperage. In order to smooth this current for feeding into the network, AC filters with coils and condensers, so-called RCL filters, are used. In spite of the smoothing action of the filter, usually there will still be distortions of the AC in the network, depreciating the quality of the current. Furthermore, this smoothing provided by the filter implies consumption of power from the network to some extent. This is even more pronounced the more unstable the network receiving the current is functioning. Power absorption from the network during the smoothing results in reduced net transmission of power from the generator to the network. For the windmill owner, this entails reduced profits, which is a great disadvantage.

DESCRIPTION OF THE INVENTION

It is therefore the purpose of the invention to provide a method which does not have the above mentioned disadvantages.

This purpose is achieved by a method for smoothing alternating electric current from a number of Power generating units, for example windmills with variable rotational speed, where the generating units are electrically connected to an electric network, and where each power generating unit includes a transformer with pulse width modulation for converting direct current to pulse width modulated alternating current for feeding to the network, and where the times for feeding the Pulses of the pulse width modulated alternating current are different for respective generating units in order to achieve a more even alternating current as a sum of respective outputs of alternating current from the generating units.

The method according to the Invention may find application in a windmill farm where the current pulses of individual windmills are fed time-delayed into the network, where the pulse width is typically made dependent on the time of feeding. This provides smoothing of the current so that it has a better quality for feeding into the electricity network, and therefore the filter absorbs less power from the network. Besides, the RCL filter for smoothing can be dimensioned much smaller, entailing a further saving for the owner of the windmill, as the filter is an expensive component in the converter.

In order to calibrate the time of feeding the Pulses, the time of feeding may advantageously be determined from a GPS time signal. GPS Signals are controlled very accurately in time, making them suited as calibration signals. However, other types of calibration signals are possible.

It is not decisive that the feeding frequencies of the different generating units are identical. Alternatively, the times of feeding for the pulses of respective generating units may be determined from feeding frequencies which differ from generating unit to generating unit. Such frequencies may be fixed, but varying frequencies may also be envisaged in application for preventing strong resonances. In addition or alternatively, a random generator may be employed in order to counteract resonances.

The Invention thus also provides a wind power plant with a number of windmills with variable rotational speed, where the windmills are connected to an electric network, and where each windmill includes a generator for producing an electric current and a converter for pulse width modulated conversion of direct current to pulse width modulated alternating current for feeding to the network, where for each windmill, a time controlling means is provided determining the time for feeding the pulses of the pulse width modulated alternating current, where the time controlling means are programmed for feeding the pulses from the various windmills at different times in order to achieve a more even alternating current.

The time control means for calibration may have GPS receivers for receiving the time signal from GPS transmitters.

Even though the method has been explained above with regard to windmills, the method may also find application in other current producing plants, e.g. in connection with utilising wave power in the sea.

SHORT DESCRIPTION OF THE DRAWING

The invention is explained in more detail in the following with reference to the drawing, wherein.

DETAILED DESCRIPTION

Figure 1:
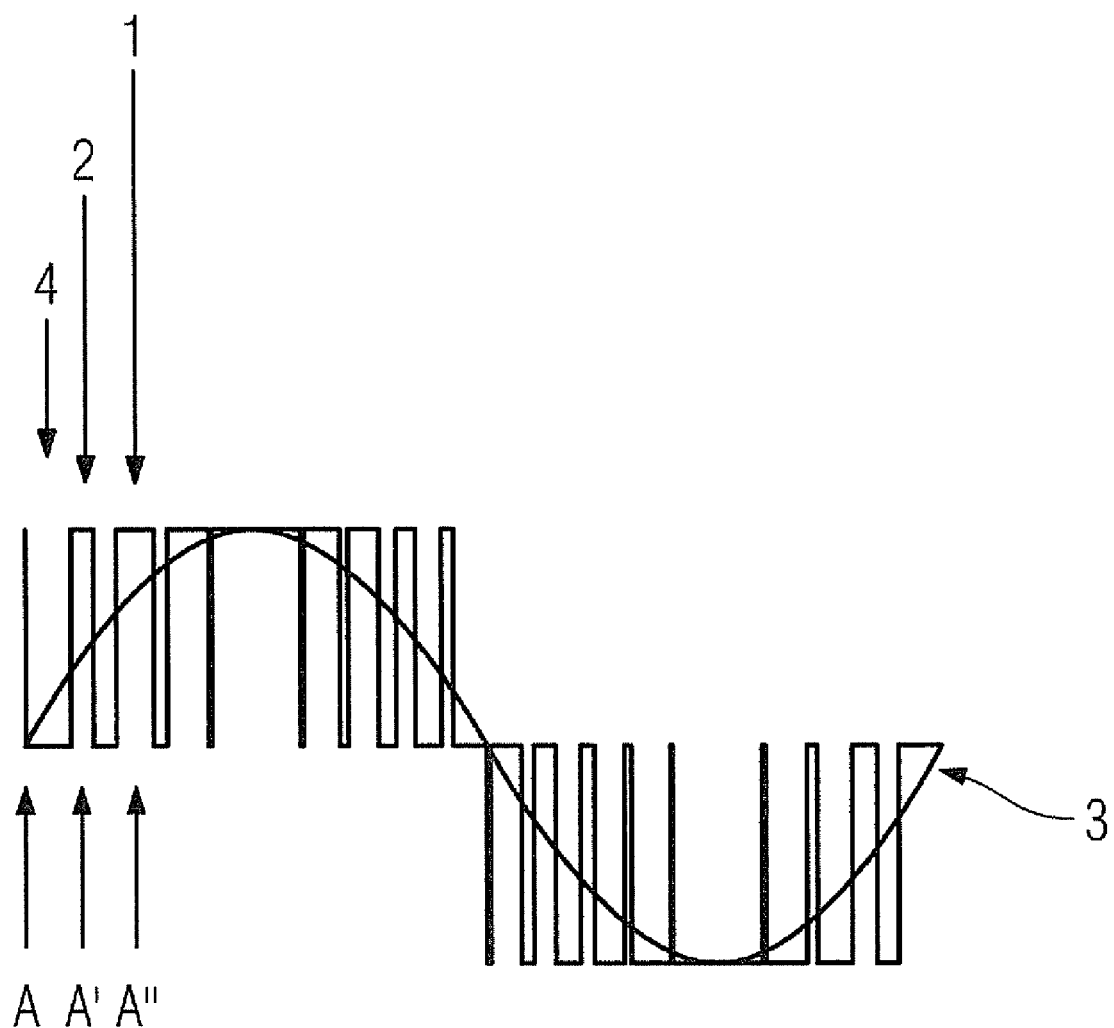
FIG. 1 shows a pulse width modulated approximation of a sine curve.

A sinusoidal signal 3 is shown an FIG. 1, and which is approximated by pulse width modulated pulses 1, 2. Pulses 1, 2 are formed with different widths into successive equidistant points in time A, A', A", where the times are determined by a predetermined frequency, which is typically a multiple of 50 Hz, e.g. 2500 Hz. The width of the pulses 1, 2 represent the strengths of the pulses. By changing the strengths of the pulses 1, 2, the sinusoidal current signal 3 is approximated.

Figure 2:
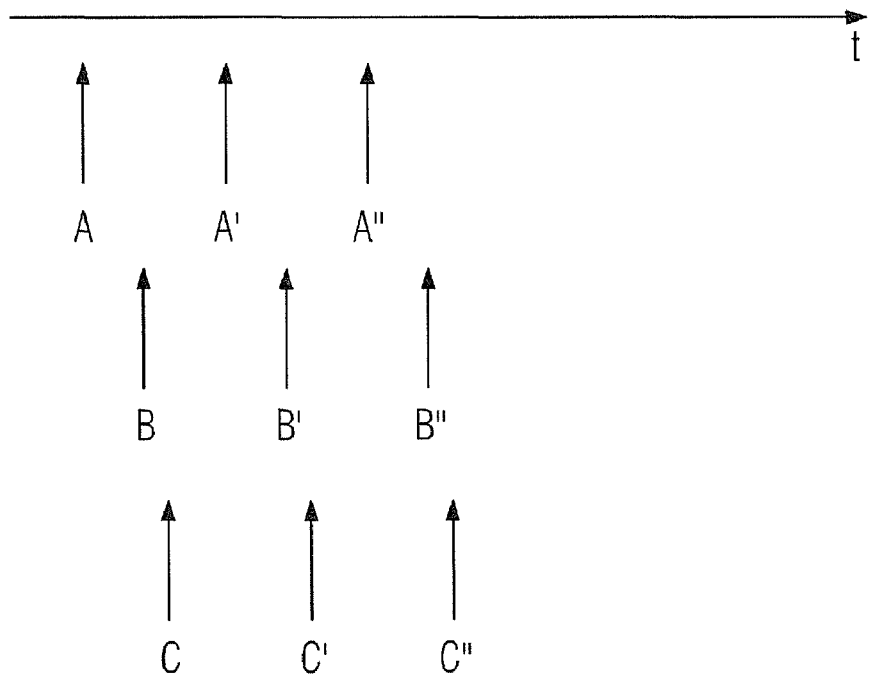
FIG. 2 illustrates three series of times for feeding pulses.

On FIG. 2 is depicted a timeline t and the three times A, A', A" for the current pulses illustrated on FIG. 1. It is assumed that the current pulses A, A', A" stem from a first series of pulse width modulated current pulses originating from a generator of a first windmill. Correspondingly, a second series of pulse width modulated current pulses B, B', B" from a second windmill and C, C', C" from a third windmill are fed in. The times of feeding for the A, B and C series are different, causing irregularities in the current to be smoothed because gaps 4, as illustrated on FIG. 1, are filled by current pulses from other generators.

Each series of pulses A, B, C represent a current signal, cf. that shown an FIG. 1. In order for these different current signals to be fed in phase, the widths of the pulses A, B, C are adapted to the strength of the desired current signal at the given point in time. The current pulses A, B and C thus have different widths.

Figure 3:
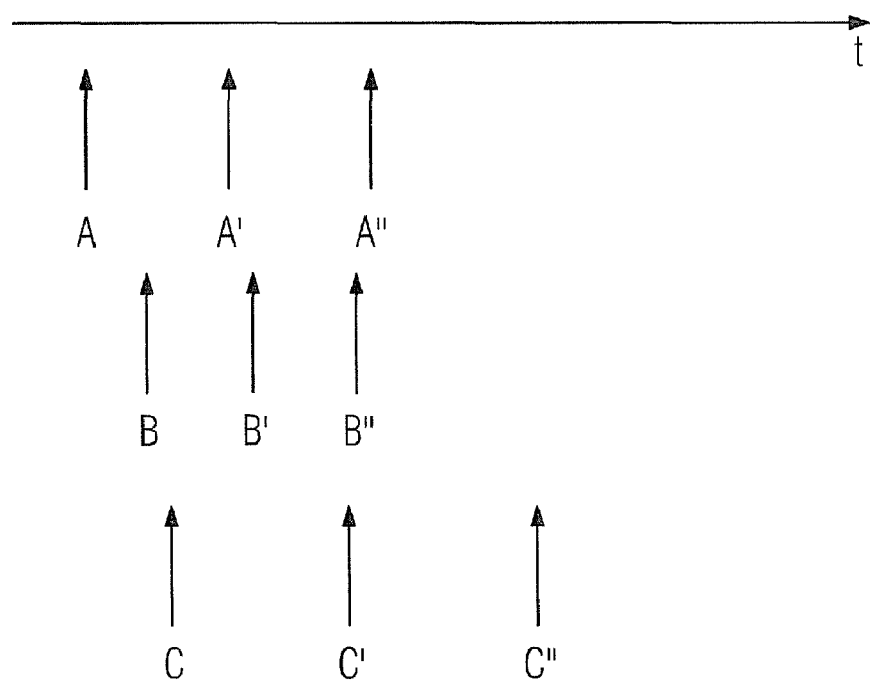
FIG. 3 illustrates three series of times with different frequencies for feeding the pulses

On FIG. 3 is illustrated an alternative embodiment. In this case, the times in the series of pulses A, B and C are equidistant in each series, but the frequencies of series A, B and C are different when comparing the series. The B series has smaller time intervals between the pulses B, B' and B" than the A series has between the pulses A, A' and A", and therefore a higher feeding frequency than the A series. However, the C series has larger time intervals between the pulses C, C' and C" than the A series, and thus a lower feeding frequency.

Even though it is stated above that the current pulses are equidistant in time, this is not decisive for the invention. The current pulses may thus also be fed at variable points in time. Moreover, random generators may be used for determining the feeding times in order to counteract resonance formation. If the times are not equidistant, it may occur that two succeeding current pulses in the same series are having the same width. In principle, it is also possible to operate with current pulses with constant width, but where the lengths of the time intervals vary. It is only important that the current signal produced by the current pulses is provided with the desired form with optimal quality in the end.

Figure 4:
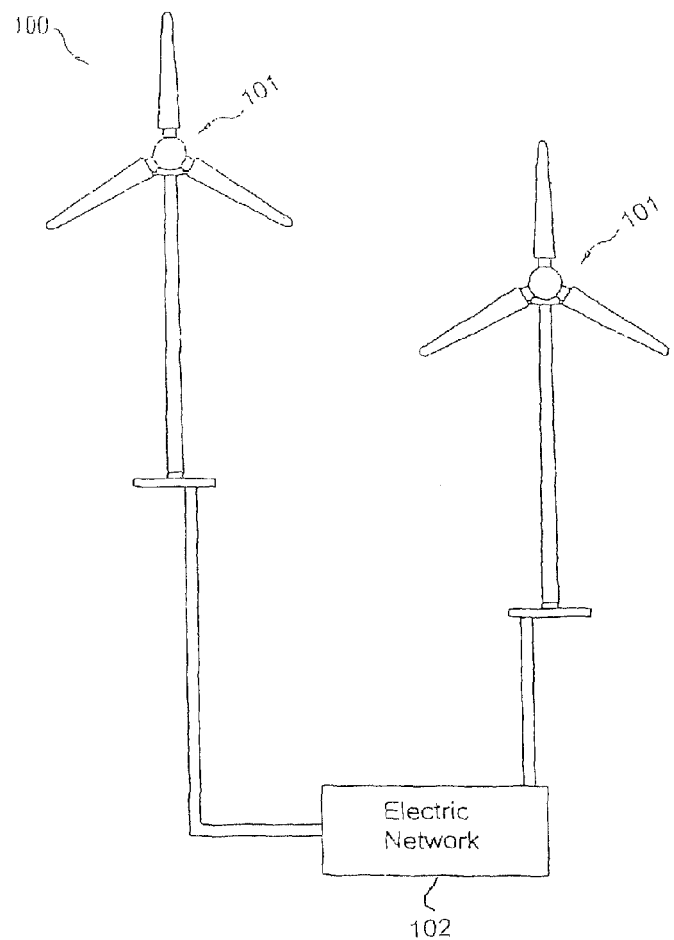
FIG. 4 illustrates an embodiment of a wind power plant.
Figure 5:
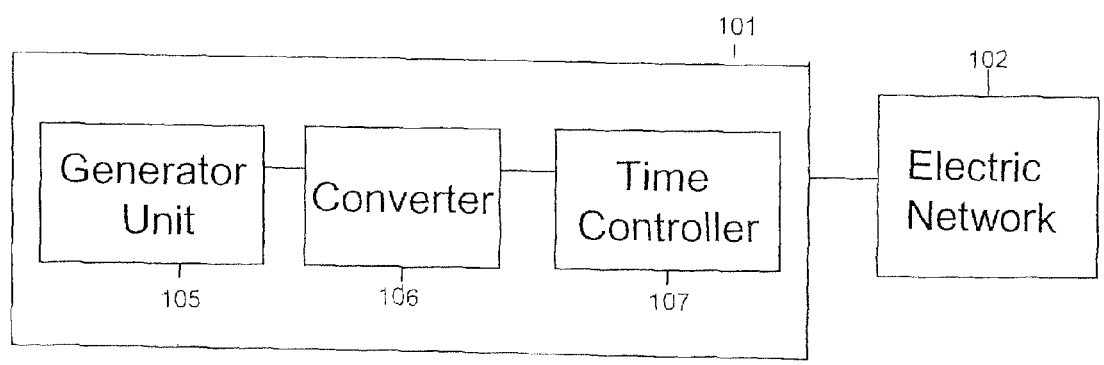
FIG. 5 illustrates an embodiment of a windmill.

FIG. 4 illustrates an embodiment of a wind power plant 100 with a plurality of windmills 101 electrically connected to an electrical network 102. FIG. 5 illustrates an embodiment of a windmill 101 connected to the electrical network 102. Each windmill 101 includes a generator 105 for producing an electric current and a converter 105 for pulse width modulated conversion of direct current to pulse width modulated alternating current for feeding to the network. Each windmill 101 further includes a time controller 107 which determines the time for feeding the pulses of the pulse width modulated alternating current to the electric network 102. While the exemplary embodiment illustrates the generator unit 105, converter 106, and time controller 107 as separate, one skilled in the art would understand that they may be combined. For example, the converter 106 could be included in the generator unit 105.

The invention claimed is:

1. A wind power plant, comprising:
   a plurality of windmills having variable rotational speed, the windmills each electrically connected to an electric network, and each windmill includes:
   a generator unit for producing an electric current,
   a converter for pulse width modulated conversion of direct current to pulse width modulated alternating current for feeding to the network, and
   a time controller determines a time for feeding the pulses of the pulse width modulated alternating current to the network,
   wherein the times the pulses are feed from each of the windmills, via the respective time controller, are different for each windmill in order to achieve a more even alternating current.

2. The wind power plant according to claim 1, wherein at least one time controller includes a GPS receiver for receiving the time signal from a GPS transmitter in order calibrate the feeding time.

3. The wind power plant according to claim 1, wherein the pulses are feed at feeding frequencies that are mutually different for the generating units.

4. The wind power plant according to claim 1, wherein the pulses are feed at the same feeding frequency for each of the generating units.

5. The wind power plant according to claim 1, wherein the pulse width of a pulse feed from each of the windmills is dependent on the time of feeding.

6. A wind power plant, comprising:
   a plurality of windmills having variable rotational speed, the windmills connected to an electric network, and each windmill includes:
   a generator unit for producing an electric current,
   a converter for pulse width modulated conversion of direct current to pulse width modulated alternating current for feeding to the network, and
   a time controller determines a time for feeding the pulses of the pulse width modulated alternating current,
   wherein the time controllers feed the pulses from the each windmill at different times in order to achieve a more even alternating current, and
   wherein at least one time controller includes a GPS receiver for receiving the time signal from a GPS transmitter in order calibrate the feeding time.

7. The wind power plant according to claim 6, wherein the times controller are programmed for feeding the pulses at feeding frequencies that are mutually different for the generating units.

* * * * *